(12) United States Patent
Matheny

(10) Patent No.: US 7,658,063 B1
(45) Date of Patent: Feb. 9, 2010

(54) GAS TURBINE HAVING A SINGLE SHAFT BYPASS CONFIGURATION

(75) Inventor: Alfred P. Matheny, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 408 days.

(21) Appl. No.: 11/437,486

(22) Filed: May 20, 2006

Related U.S. Application Data

(60) Provisional application No. 60/700,177, filed on Jul. 15, 2005.

(51) Int. Cl.
*F02K 1/38* (2006.01)
(52) U.S. Cl. ............................ 60/262; 60/226.1; 60/204
(58) Field of Classification Search ................ 60/226.1, 60/262, 226.2, 226.3, 204
See application file for complete search history.

(56) References Cited

U.S. PATENT DOCUMENTS

| | | | | |
|---|---|---|---|---|
| 3,418,808 A | * | 12/1968 | Rich | 60/226.1 |
| 4,175,384 A | | 11/1979 | Wagenknecht et al. | |
| 4,226,084 A | | 10/1980 | Spears, Jr. | |
| 4,592,201 A | | 6/1986 | Dusa et al. | |
| 4,791,784 A | * | 12/1988 | Minardi et al. | 60/262 |
| 4,799,354 A | * | 1/1989 | Midgley | 60/788 |
| 5,003,773 A | * | 4/1991 | Beckwith | 60/262 |
| 5,806,303 A | | 9/1998 | Johnson | |
| 5,809,772 A | | 9/1998 | Giffin, III et al. | |
| 6,151,882 A | | 11/2000 | Cavanagh | |
| 6,471,216 B1 | * | 10/2002 | Brainch et al. | 277/418 |
| 6,532,731 B2 | | 3/2003 | Springer | |
| 2004/0255573 A1 | * | 12/2004 | Rago | 60/262 |
| 2007/0240424 A1 | * | 10/2007 | Matheny et al. | 60/772 |
| 2008/0112794 A1 | * | 5/2008 | Lee et al. | 415/115 |

FOREIGN PATENT DOCUMENTS

GB 2172056 A * 9/1986

* cited by examiner

*Primary Examiner*—Michael Cuff
*Assistant Examiner*—Phutthiwat Wongwian
(74) *Attorney, Agent, or Firm*—John Ryznic

(57) ABSTRACT

A gas turbine engine used in an aircraft includes a fan to provide a bypass flow through the engine. The fan delivers some airflow to the compressor for compression, and a fuel is mixed with the compressed air and delivered to a turbine to drive the engine and compressor and fan. The fan also delivers airflow to a central bypass passage located inward of the compressor. Guide vanes both upstream and downstream of the combustor each with cooling air passages therein, pass the bypass airflow from the inner bypass passage into an outer bypass passage located outward of the combustor and the turbine. The bypass flow through the guide vanes also cool the guide vanes and pass over and around the combustor to cool the combustor. The bypass airflow exits the engine at a location outward of the hot gas flow from the turbine. In an alternative embodiment, an inner bypass passage located inward of the central bypass passage also carries bypass airflow from the fan and through the engine to be mixed with the hot gas flow and the outward bypass flow.

18 Claims, 2 Drawing Sheets

GAS TURBINE HAVING A SINGLE SHAFT BYPASS CONFIGURATION

CROSS-REFERENCE TO RELATED APPLICATIONS

The application claims the benefit to an earlier filed Provisional Application Ser. No. 60/700,177 filed on Jul. 15, 2005 and entitled GAS TURBINE HAVING A SINGLE SHAFT BYPASS CONFIGURATION.

STATEMENT REGARDING FEDERALLY SPONSORED RESEARCH OR DEVELOPMENT

None.

BACKGROUND OF THE INVENTION

1. Field of the Invention

The present invention relates to a gas turbine engine having a fan bypass passage.

2. Description of the Related Art Including Information Disclosed Under 37 CFR 1.97 and 1.98

Modern gas turbine engines used for aircraft propulsion use a fan in addition to the compressor and turbine sections to produce power for propelling the aircraft. A typical aero gas turbine engine includes a fan blade connected to the rotor shaft of the engine, a compressor section having a plurality of rows of compressor blades also connected to the rotor shaft, a combustor section to burn a fuel with the compressed air supplied from the compressor, and a turbine section also having a plurality of rows of turbine blades that convert the hot gas stream from the combustor into rotary motion of the rotor shaft, which then also drives the compressor. The fan provides two flow paths. One flow path delivers air to the inlet of the compressor, while a second flow path bypasses the compressor and turbine sections to produce a driving force for the engine.

In a Prior Art gas turbine engine like the U.S. Pat. No. 5,592,201 issued to Dusa et al on Jun. 3, 1986 and entitled TURBOFAN MIXED FLOW EXHAUST SYSTEM, the bypass flow passes around the outside of the compressor, combustor, and turbine sections, and is joined with the combustion gas downstream of the turbine. This bypass flow also acts to cool the combustor and turbine section, as well as reduce noise from the high speed gas flow exiting the turbine.

Another type of gas turbine engine with a bypass flow is shown in U.S. Pat. No. 6,532,731 issued to Springer on Mar. 18, 2003 and entitled TURBOFAN ENGINE HAVING CENTRAL BYPASS DUCT AND PERIPHERAL CORE ENGINE, and U.S. Pat. No. 6,151,882 issued to Cavanagh on Nov. 28, 2000 and entitled TURBOFAN ENGINE CONSTRUCTION, which both show a gas turbine engine in which the bypass flow is through the center of the engine instead of around the outside like in the above mentioned Dusa et al patent.

BRIEF SUMMARY OF THE INVENTION

An aero gas turbine engine having a compressor, a combustor, and a turbine, and a bypass fan to produce a bypass flow through the engine. the bypass passage passes through a central portion of the engine in the compressor section, and is divided into a first flow path that continues to flow by the combustor in a central passage and a second flow passage that passes through a guide vane upstream of the combustor and into a flow path outside of the combustor section. The central bypass flow through the combustor is then directed through cooling passages in the guide vanes of the turbine, and mixed with the first bypass flow passage over the turbine section. The hot gas flow from the combustor and turbine is then joined with the bypass flows at the engine exit in which the bypass flows are joined and envelope the hot gas flow from the turbine to reduce noise from the engine. a first embodiment uses an axial flow compressor, while a second embodiment uses a centrifugal compressor. A third embodiment combines a central bypass and an outer bypass to sandwich the hot gas flow path there between.

DETAILED DESCRIPTION OF THE INVENTION

Figure 1:
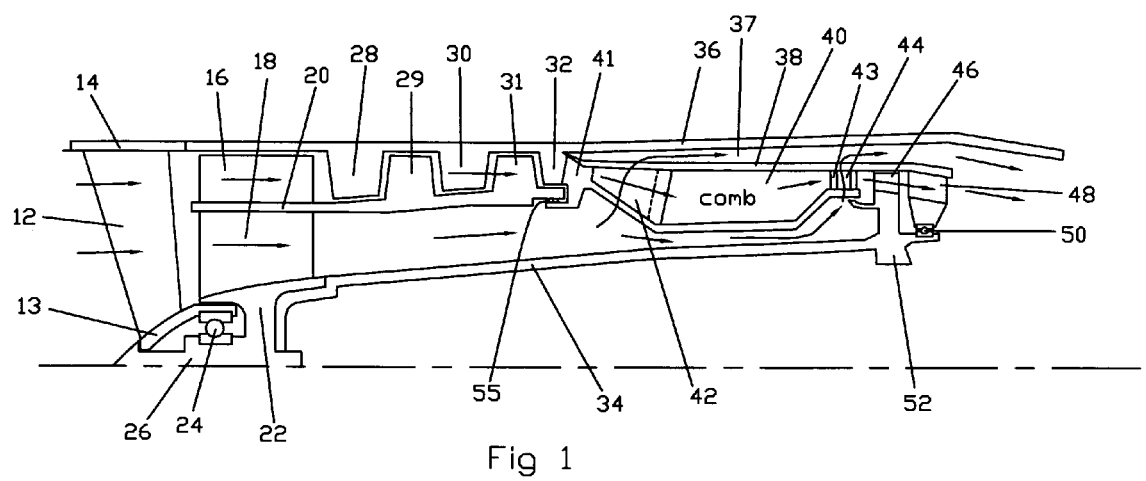
FIG. 1 shows a cross section view of a gas turbine engine of the present invention with an axial flow compressor.

The present invention is a gas turbine engine in which a single shaft is used to drive a compressor that includes a high compression blade section and a fan blade section to produce the bypass flow. FIG. 1 shows a first embodiment of the present invention, which comprises an inlet guide vane 12 supported by an outer shroud 14 and an inner shroud 13 to direct air from outside the turbine to the compressor and fan blades, a high compression blade 16, a fan blade 18, a compressor shaft 20, a rotor disc 22 in which the high compression blades 16 and fan blades 18 are secured for rotation, a rotor shaft 26, compressor guide vanes (28, 30, 32) extending from an inside surface of an outer casing 36, compressor blades (29, 31) rotatably secured to the compressor shaft 20, a combustor 40, an inlet guide vane 41 to direct compressed air into the combustor 40, a bypass passage 42 in the guide vane 41, a bypass passage 37 formed between the outer casing 36 and a combustor wall 38, a combustor guide vane 43 also having a bypass passage 44 therein, a turbine blade 46 connected to a turbine rotor disc 52, which is connected to a rotary shaft 34, bearings 24 and 50 to rotatably support the rotor shaft 26 and rotor shaft 34, a turbine outlet guide vane 48, and a labyrinth seal 55. Combustor 40 can be either a can combustor or an annular combustor.

The gas turbine engine of the FIG. 1 embodiment shows the bypass fan blades 18 located radially inward from the high compression blades 16. This is the preferred arrangement for a single shaft gas turbine engine that uses a bypass fan arrangement. The bypass fan is of a low velocity compared to the compression blades for the compressor. A person of ordinary skill in the art would recognize that the compression blade 16 will have a higher tangential velocity than would the fan blade 18 since the compression blade 16 is located radially outward from the fan blade 18. Locating the fan blade 18 radially inward from the compression blades 16 allows for the bypass fan to produce a low velocity while allowing for the compression blades 16 and compressor to provide the high compression due to a higher tangential velocity of rotation.

The bypass path begins at a radial inward location with respect to the compressor path, flows by the compressor at a point radially inward of the compressor, splits up into one flow path that passes through the combustor guide vane 41 through the guide vane passage 42 to cool the guide vane and over the combustor 40 and another flow path that flows radially inward of the combustor. Both flow paths around the combustor act to cool the combustor. The flow path radially inward of the combustor 40 is diverted through a cooling passage 44 in the combustor guide vane 43 to be joined with the flow path radially outward of the combustor before being joined with the turbine exhaust gas. In the FIG. 1 embodiment, the bypass flow is used to cool the combustor inlet guide vane 41 and the combustor outlet guide vane 43 as well as the combustor.

Figure 2:
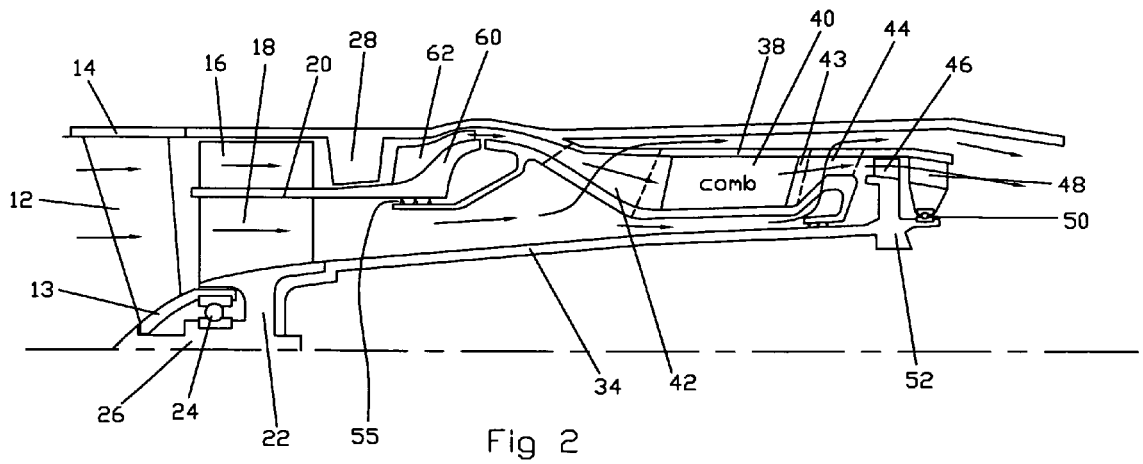
FIG. 2 shows a cross section view of a gas turbine engine of the present invention with a centrifugal flow compressor.

A second embodiment of the present invention is shown in FIG. 2. The main difference between this second embodiment and FIG. 1 is the use of a radial compressor 60 with an impeller 62 instead of the axial flow compressor used in FIG. 1. Parts having the identical numbers in FIGS. 1 and 2 are the same parts. In FIG. 2, the combustor includes a different arrangement for the rear seal. In FIG. 1, the rear seal of the combustor is an extension from the turbine disk and rotor 52. In FIG. 2, the rear seal is a labyrinth seal extending from an arm of the combustor and engaging the rotor shaft 34. The bypass flow paths are the same for FIGS. 1 and 2.

Figure 3:
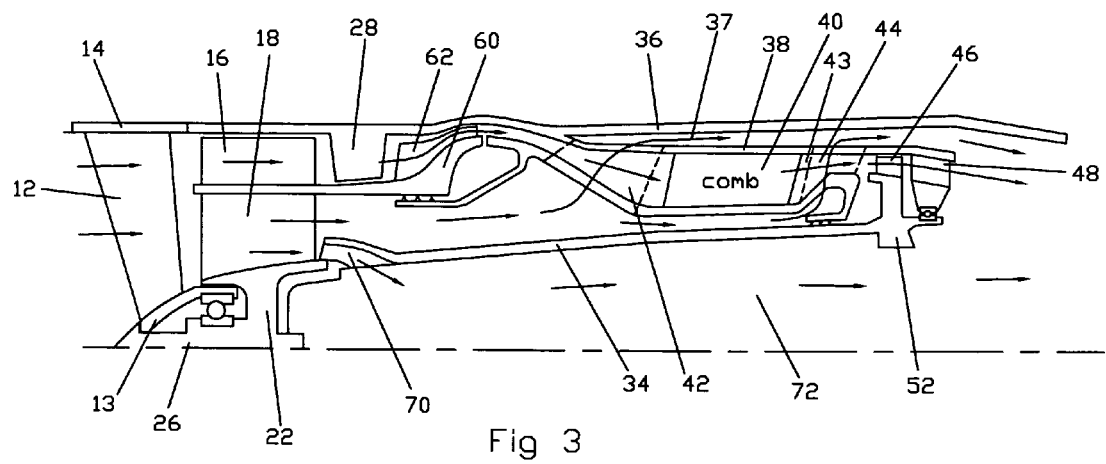
FIG. 3 shows a cross section view of a gas turbine engine of the present invention with a centrifugal flow compressor and an inner and an outer bypass flow.

The FIG. 3 embodiment of the present invention differs from the FIGS. 1 and 2 embodiments in that FIG. 3 includes an additional bypass path through an opening 70 in the rotor shaft 34 that leads into an inner bypass 72. The inner bypass 72 channels air flow from the fan through the opening 70 and out the rear of the engine to by joined with the hot gas flow from the turbine and the bypass flow through the outward bypass passage 37. The FIG. 3 embodiment is shown with a radial compressor like that in FIG. 2. However, the FIG. 3 embodiment could use an axial flow compressor like that in the FIG. 1 embodiment without departing from the concept of the present inventions. The second bypass flow in the FIG. 3 embodiment passes out the turbine exhaust inward of the combustion gas exhaust from the turbine. The turbine combustion exhaust—which is of high temperature and high velocity—is sandwiched between the outward bypass flow and the inward bypass flow.

Figure 4:
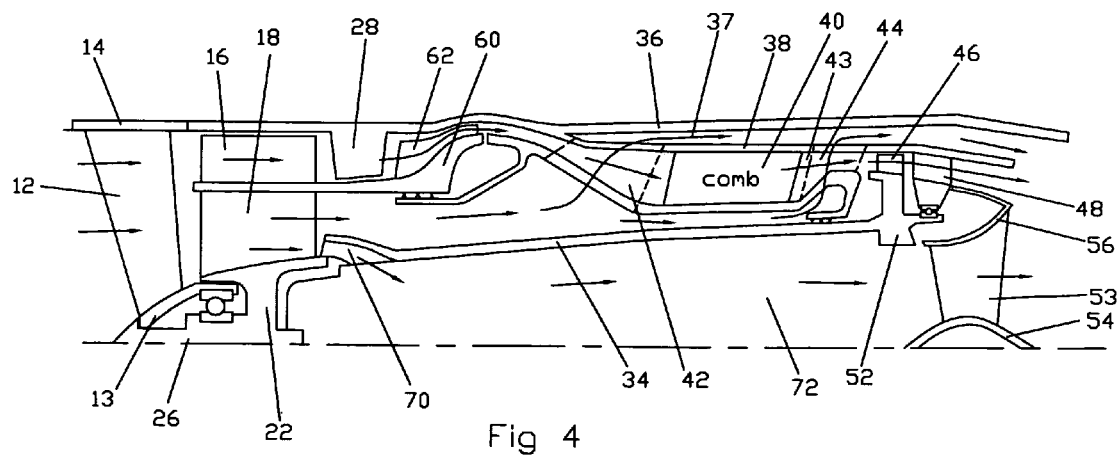
FIG. 4 shows a cross section view of a gas turbine of the present invention of FIG. 3 with the addition of an exit guide vane assembly down stream of the turbine section.

FIG. 4 shows the embodiment of FIG. 3 but with an additional exit guide vane assembly 53 located downstream of the turbine 46 and turbine guide vane 48. The guide vane 53 includes an inner shroud 54 and an outer shroud 56 that provides for a cone shaped nozzle at the exit of both the turbine and the inner bypass 72. This guide vane 53 configuration is used to straighten the flow.

I claim the following:

1. A gas turbine engine, comprising:
   a fan driven by a rotor shaft;
   a compressor connected to the rotor shaft;
   a combustor to burn a fuel with compressed air from the compressor to produce a hot gas flow;
   a turbine to produce rotary motion of the rotor shaft from the hot gas flow;
   a central bypass passage passing through the compressor and inward of the combustor;
   an outer bypass passage passing outward of the combustor;
   an air passage to connect the central bypass passage of the compressor with the outer bypass passage of the combustor;
   means to merge the outer bypass passage flow with the central bypass passage flow; and,
   the airflow from the central bypass passage and the outer bypass passage does not enter the combustor or the turbine.

2. The gas turbine engine of claim 1, and further comprising:
   the air passage to connect the central bypass passage with the outer bypass passage is a cooling flow passage through a guide vane upstream of the combustor.

3. The gas turbine engine of claim 1, and further comprising:
   a second air passage located downstream of the combustor to carry flow from the central bypass passage inward of the combustor to the outer bypass passage.

4. The gas turbine engine of claim 3, and further comprising:
   the second air passage is a cooling flow passage through a guide vane located upstream of the first stage blade in the turbine.

5. The gas turbine engine of claim 1, and further comprising:
   the compressor is an axial flow compressor.

6. The gas turbine engine of claim 1, and further comprising:
   the compressor is a centrifugal flow compressor.

7. The gas turbine engine of claim 1, and further comprising:
   an opening downstream of the fan to carry air flow from the fan; and,
   an inner bypass passage located inward of the compressor, the combustor, and the turbine to carry air flow from the opening and out the rear of the engine, where by airflow through the inner bypass passage is joined with the hot gas flow from the turbine and the bypass air flow from the outer bypass passage.

8. The gas turbine engine of claim 7, and further comprising:
   an exit guide vane located at a downstream end of the inner bypass passage and having a cone shaped nozzle to mix the hot gas flow from the turbine with the airflow of the inner bypass passage.

9. A method of operating a gas turbine engine, the gas turbine engine having a compressor and a combustor and a turbine and a bypass fan, the method comprising the steps of:
   directing a portion of the airflow from the fan through a central bypass passage located inward of the compressor;
   passing the airflow through the central bypass passage without passing the airflow through the combustor or the turbine;
   directing the airflow from the central bypass passage, at a location upstream of the turbine, to an outer bypass passage located outward of the turbine; and,
   directing the bypass flow out the engine outward from the hot gas flow exiting the turbine.

10. The method of operating a gas turbine engine having a bypass fan of claim 9, and further comprising the step of:
    the step of directing the airflow from the central bypass passage to an outer bypass passage includes the step of passing the airflow through a first guide vane located upstream of the combustor to cool the first guide vane.

11. The method of operating a gas turbine engine having a bypass fan of claim 10, and further comprising the step of:
    the step of directing the airflow from the central bypass passage to an outer bypass passage includes the step of passing the airflow through a second guide vane located downstream of the combustor to cool the second guide vane.

12. The method of operating a gas turbine engine having a bypass fan of claim 9, and further comprising the step of:

diverting a portion of the central bypass passage flow into an inner bypass passage that passes through the engine and discharges the bypass flow through the inner passage out of the engine.

13. The method of operating a gas turbine engine having a bypass fan of claim 12, and further comprising the step of:
providing for a guide vane at the exit of the inner bypass passage with a cone shaped nozzle to mix the inner bypass air flow with the hot gas flow and the outer bypass flow.

14. The gas turbine engine of claim 1, and further comprising:
the central bypass passage is located radial inward of the compressor blades and concentric to the rotational axis of the gas turbine engine.

15. The gas turbine engine of claim 1, and further comprising:
the combustor includes an inner wall and an outer wall; and,
the central bypass passage and the outer bypass passage passes the bypass air flow over the combustor on the inner wall and the outer wall of the combustor.

16. The gas turbine engine of claim 1, and further comprising:
the combustor is an annular combustor with an inner wall and an outer wall; and,
the central bypass passage and the outer bypass passage passes the bypass air flow over the combustor on the inner wall and the outer wall of the combustor.

17. The gas turbine engine of claim 1, and further comprising:
the gas turbine engine is a single spool engine.

18. The gas turbine engine of claim 1, and further comprising:
the central bypass passage and an inner bypass passage at the combustor forms a substantially straight passage for the bypass air from the fan to an aft end of the combustor.

* * * * *